United States Patent [19]

Coles et al.

[11] Patent Number: 4,702,558

[45] Date of Patent: Oct. 27, 1987

[54] LIQUID CRYSTAL INFORMATION STORAGE DEVICE

[75] Inventors: Harry J. Coles, Woodford; Richard Simon, Macclesfield, both of England

[73] Assignee: The Victoria University of Manchester, Manchester, England

[21] Appl. No.: 648,519

[22] Filed: Sep. 10, 1984

[30] Foreign Application Priority Data

Sep. 14, 1983 [GB] United Kingdom ............. 8324642

[51] Int. Cl.[4] .............. C09K 19/00; C09K 19/52; C09K 19/12; G02F 1/13
[52] U.S. Cl. .................. 350/330; 252/299.01; 252/299.1; 252/299.66; 252/299.67; 350/351; 350/350 R; 350/350 S
[58] Field of Search ............ 252/299.01, 299.1, 299.66, 252/299.67; 350/350 R, 350 S, 351, 349, 330

[56] References Cited

U.S. PATENT DOCUMENTS

| | | | |
|---|---|---|---|
| 4,040,047 | 8/1977 | Hareng et al. | 350/350 S |
| 4,139,273 | 2/1979 | Crossland et al. | 252/299.66 |
| 4,232,951 | 12/1980 | Aharoni et al. | 350/351 |
| 4,293,435 | 10/1981 | Portugall et al. | 252/299.67 |
| 4,358,391 | 11/1982 | Finkelmann et al. | 252/299.67 |
| 4,416,515 | 11/1983 | Funada et al. | 350/350 F |
| 4,617,371 | 10/1986 | Blumstein et al. | 252/299.01 |
| 4,657,694 | 4/1987 | Heeger et al. | 252/299.01 |

OTHER PUBLICATIONS

Achard et al, Mol Cryst Liq Cryst, vol. 92, 1983, pp. 111–118.

Primary Examiner—Teddy S. Gron
Assistant Examiner—J. E. Thomas
Attorney, Agent, or Firm—Nies, Webner, Kurz & Bergert

[57] ABSTRACT

A liquid crystal information storage device comprising a layer of material containing a side chain polymeric liquid crystal. At least a part of the material is heated from a viscous state above its glass transition temperature, to a fluid region in which the liquid crystalline material can readily undergo field-induced alignment. The material is addressed in this fluid region so as to achieve the selective variation in texture and orientation of molecules within the material and so record information, and the material is subsequently cooled and returned to its viscous state whereupon the information is retained.

21 Claims, 5 Drawing Figures

LIQUID CRYSTAL INFORMATION STORAGE DEVICE

The present invention relates to liquid crystal information storage devices based on liquid crystalline polymers or liquid crystalline materials containing such polymers.

It is well known that low molecular weight or monomeric liquid crystals consists of compounds having an elongated or rod-like structure usually with a rigid core. In addition, molecules which show such liquid crystalline behaviour usually contain a permanent electrical dipole and easily polarisable chemical groups.

Liquid crystal phases, or mesophases, show varying degrees of molecular ordering between the almost perfect three dimensional structure of a crystalline solid which exhibits positional and orientational order and the randomly ordered state of an isotropic fluid.

The varying degrees of order possessed by liquid crystals give rise to three distinct mesophases known as the smectic, nematic and cholesteric phases. In a smectic moesphase one degree of positional order is absent and this leads to a phase which has the orientational order of the crystalline state together with a two dimensional directional order. The phase thus has a lamellar structure.

In the nematic phase all positional order is lost so that the centres of gravity of the molecules are arranged randomly in space. The orientational order is however maintained so that there is a statistical orientational ordering of the molecules parallel to their long axes.

In the cholesteric mesophase the molecular order is characterised by an orientational order similar to that found in nematics but in this phase the axis direction chages continuously along an axis perpendicular to the first and traces out of helical path. This mesophase is also sometimes known as the twisted, nematic mesophase and requires that the mesogenic material is optically active. If the pitch of the helix is of the order of the wavelength of visible light, then a characteristic of this mesophase is a bright selective colour reflection. Such cholesteric mesophases are often used in thermography since slight temperature changes distort the helix pitch and this leads to a change in the colour of the reflected light.

Low molecular weight liquid crystals having a nematic, smectic or cholesteric structure have been disclosed and because of their optical properties have found many technological uses especially in the optoelectronic field.

Recently it has been realised that certain types of polymer above their glass transition temperature behave as liquid crystals and exhibit thermotropic mesomorphism. Such polymers fall into two groups, namely main chain and side chain thermotropic polymer liquid crystals. Their synthesis follows a simple concept whereby mesogenic segments (the term mesogenic means materials which can exist in mesomorphic modifications), usually though not necessarily, substituted monomeric liquid crystals are incorporated into the polymer in one of two ways:

(a) the mesogenic segments can form part of the polymer backbone, usually via flexible polymethylene spacers, to give a main chain polymeric liquid crystal; or (b) the mesogenic segments can be attached to the polymer backbone via flexible spacers giving a side chain polymeric liquid crystal e.g. poly[di(N-p-acryloyloxybenzylidine)-p-diaminobenzene]

Polymers with liquid crystal side groups as described above are well known; see S. B. CLOUGH, A. BLUMSTEIN and E. C. HSU, Macromolecules 9, 123 (1976); V. N. TSVETKOV et al., EUROP. POLYMER J. 9, 481 (1973); L. STRZELECKY and L. LIBERT, BULL.SOC. CHIM. FRANCE (1973), p. 297. In all of such polymers, the backbones are flexible and do not impart directionally to the pendant side chains. Side chain polymeric liquid crystals of the cholesteric type with flexible backbones are described in U.S. Pat. No. 4,293,435, while U.S. Pat. No. 4,232,951 describes a polymeric liquid crystal material having an extended rigid polymer backbone with flexible non-mesomorphic pendant groups.

Polymeric liquid crystals of both types exhibit nematic or cholesteric and/or smectic mesophases according to the physical ordering of the mesogenic segments as a function of temperature.

Liquid crystal polymers exhibit a glass-to-mesophase transition as opposed to the crystalline-to-liquid crystalline phase transition of monomeric liquid crystals. Crystalline transitions destroy liquid crystalline order whereas glass transitions store the liquid crystalline order. The viscosity of polymeric liquid crystals is of 1 to 2 orders of magnitude greater than monomeric liquid crystals. This makes device fabrication considerably simpler than with monomeric liquid crystals. There is no need for hermetic sealing, spacers, encapsulation techniques or special aligning procedures, e.g. treating the surfaces of the device, or enclosing the liquid crystal material. The polymers are thermally formed and maintain their shape unless heated to an isotropic state. The use of the glass transition behavior of polymeric liquid crystals to store information resulting from applying an alignment field to a device containing a polymeric liquid crystal is described in U.S. Pat. No. 4,293,435.

By an alignment field, we mean the external factor which is used to alter the texture and orientation of the liquid crystal molecules; such factors include, for example, electrical and magnetic fields, and pressure (both acoustic and mechanical).

In U.S. Pat. No. 4,293,435, devices are described which are addressed in the non-glassy state to induce a change in cholesteric texture in response to the alignment field and then cooled to a glassy state so that the induced cholesteric structure is conserved even when the means causing the alignment is removed e.g. in the case of an electric field, by switching off the field.

This storage below the glass transition temperature $(T_g)$ in the solid state requires $T_g$ to be above the ambient temperature $(T_a)$. This in turn means that the polymer system is required to operate at temperatures as much as 100° C. above $T_a$ in ordear to accomplish recording of information to be stored, in a reasonable time. This high operating temperature, aside from being practically inconvenient will, in time, result in degradation of the polymer. We have now found that such problems can be avoided by our appreciation that in the case of certain side chain liquid crystal polymers, it is unnecessary to use the region below the glass transition temperature for storage, and that in fact stable storage for many years is achievable at temperature above $T_g$, and below a temperature $(T_r)$ at which the polymeric material begins to become fluid.

When the transmission of light between crossed polarisers through a liquid crystal polymeric material is monitored as the temperature is increased from $T_g$, a temperature $T_r$ is reached several degrees below the smectic-to-isotropic phase transition, at which point the light transmission suddenly increases signifying a sudden decrease in viscosity. The temperature region above this temperature $T_r$ will be referred to as the "fluid region". This increase corresponds to a texture change from an anisotropic but opaque region to a highly birefringent and therefore transmitting region. The light level continues to increase until it reaches a maximum at a temperature ($T_m$) which corresponds to the point where the isotropic or clear phase first begins to appear. Because the isotropic phase shows extinction between crossed polarisers, further increases in temperature cause a fall in the light level as the isotropic regions increase in size until a temperature ($T_c$) is reached, the so-called clearing temperature, corresponding to the disappearance of the last of any birefringent structure in the melt capable of being aligned. Thus the material is biphasic (mesomorphic and isotropic) until Tc at which temperature the material becomes fully isotropic. FIG. 2 shows the general shape of the curve obtained. The determination of the various temperatures $T_g$, $T_r$, $T_m$, and $T_c$ for any polymeric liquid crystal material is therefore within the competence of those skilled in the art, and the experimental procedures are described in relation to an embodiment of the present invention later in this specification.

According to the present invention, therefore, there is provided a liquid crystal information storage device comprising a layer of material containing a side chain polymeric liquid crystal, means for effecting a thermal transition of at least a part of the material from a viscous state in which its temperature is in the range $T_g$ to $T_r$, to the fluid region as hereinbefore defined, and means for addressing at least a part of the material in the fluid region so as to achieve a selective variation in texture and orientation of molecules within the material and so record information, which information is retained on allowing the material to cool out of the fluid region and return to the viscous state.

It is therefore essential to use polymeric materials in which $T_r > T_a > T_g$. The rate of variation in texture or alignment, i.e. speed of addressing, is dependent on $T_r$-$T_g$. The larger $T_r$-$T_g$, the faster the alignment. We have found, for example, with $T_r$-$T_g$ values of the order of 80° C., alignment times of 1 to 5 seconds are achievable, whereas, when Tr-Tg is of the order of 40° C., alignment times can be as long as 5 to 10 minutes.

The accompanying drawings are provided as an illustration, by way of example only, of a liquid crystal information storage device made in accordance with the invention. In the drawings FIG. 1 is a schematic cross-sectional view of a device made in accordance with the invention, FIG. 2 is a graph of light transmission against temperature illustrating how a display is stored in said device and FIGS. 3, 4 and 5 are graphs of response times against respectively temperature, applied voltage and frequency under different operating conditions, for a side chain polymeric liquid crystal operating in accordance with the invention.

One group of polymeric materials which we have found satisfactory for use in the device of the invention, and which can be made with a $T_g$ well below $T_a$, are smectic side chain polymeric materials such as those of the polysiloxane type. These should preferably have cyano-biphenyl side chains. One particular material coded CP 1, has in addition to cyano-biphenyl side chains, methylated benzoic acid ester side chains. The structure is given by the formula

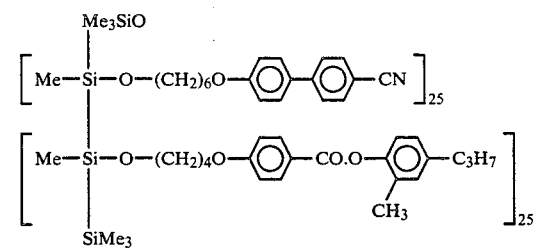

This material has the following values for $T_g$, $T_r$, $T_m$ and $T_c$, namely, 4° C., 82° C., 93° C. and 105° C., respectively.

$T_g$ is therefore below ambient temperature under normal indoor conditions.

Suitable liquid crystal materials which can be used to form side chains and give smectic side chain liquid crystal polymeric materials when appended to a flexible siloxane backbone are given by the following examples, where g, k, s, n and i are respectively, the glassy, crystalline, smectic, nematic, and isotropic phases.

(a) Homopolymers

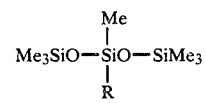

| EXAMPLE | R | PHASE TRANSITIONS |
|---|---|---|
| 1 | —(CH₂)₄O—⌬—⌬—CN | g  28.3  s  132.5  i |
| 2 | —(CH₂)₅O—⌬—⌬—CN | g  14.6  s  169.5  i |

-continued
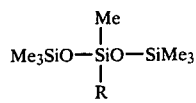
| EXAMPLE | R | PHASE TRANSITIONS |
|---|---|---|
| 3 | —(CH$_2$)$_4$O—⟨C$_6$H$_4$⟩—CO.O—⟨C$_6$H$_4$⟩—CN | g 26 s 150 i |
| 4 | —(CH$_2$)$_7$O—⟨C$_6$H$_4$⟩—CO.O—⟨C$_6$H$_3$(CH$_3$)⟩—CN | g 9 s 87 i |
| 5 | —(CH$_2$)$_8$O—⟨C$_6$H$_4$⟩—CO.O—⟨C$_6$H$_3$(CH$_3$)⟩—CN | g 9 s 102 i |
| 6 | —(CH$_2$)$_{11}$O—⟨C$_6$H$_4$⟩—CO.O—⟨C$_6$H$_3$(CH$_3$)⟩—CN | g 8 k 45 s 131 i |
| 7 | —(CH$_2$)$_4$—[1,3-dioxolane]—⟨C$_6$H$_4$⟩—CN | s 195 i |
| 8 | —(CH$_2$)$_4$—⟨C$_6$H$_4$⟩—⟨C$_6$H$_4$⟩—CN | s 130 i |
| 9 | —(CH$_2$)$_3$—[1,3-dioxolane]—⟨C$_6$H$_4$⟩—CN | g 113 s 134 n 150 i |
(b) Co-polymers
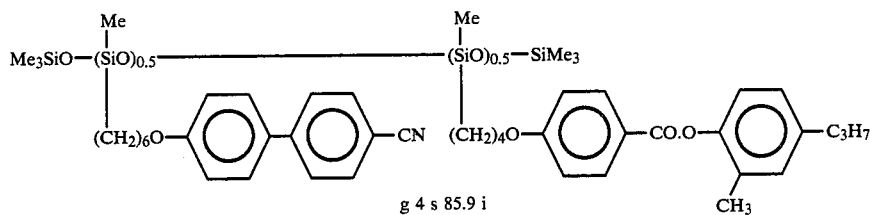
g 4 s 85.9 i
(c) Terpolymers

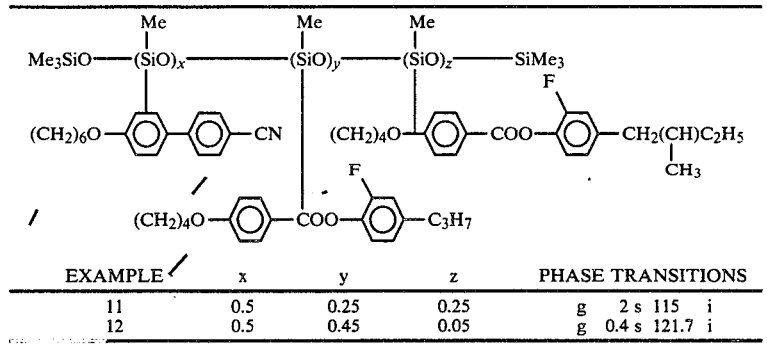

| EXAMPLE | x | y | z | PHASE TRANSITIONS |
|---|---|---|---|---|
| 11 | 0.5 | 0.25 | 0.25 | g  2 s  115  i |
| 12 | 0.5 | 0.45 | 0.05 | g  0.4 s  121.7  i |

Amongst the siloxane polymers are polymers which undergo a transition from a smectic phase to a crystalline phase in cooling rather than a transformation to a glassy phase. If the smectic-to-crystalline transition takes place below ambient temperature the materials can be used in the devices of the present invention. If above ambient, storage will be lost and hence materials having that characteristic cannot be used.

We have found unexpectedly that despite the fact that the preferred polymeric materials for use in the devices of the present invention are smectogenic in character, we can still achieve response times of the order of seconds or less in the fluid region. FIGS. 3, 4 and 5 illustrate rise time or response time under different conditions for co-polymer CP 1. The response or rise time is defined as the time for the light transmission to drop to 50% of its initial value.

FIG. 3 shows response times at temperatures just above 80° C. through Tr to above Tm for a fixed voltage (300 $V_{rms}$) and frequency (3 KHz sinewave). This shows the steep rise in the response time as ambient temperature and Tr are approached. Tr therefore defines the point at which the viscosity suddenly changes.

The invention also further includes a device in which the aligning field uses an electric field to effect field-induced alignment in pre-determined areas in the form of a sine wave at a frequency of 2 to 4 KHz.

Preferably the alignment is effected at a temperature below the inherent clearing temperature of said polymer and below $T_m$, the material then being cooled to a permanent state prior to removing said field. If a sufficiently high cooling rate is induced, the field may be removed prior to cooling.

In cases where slow alignment is acceptable, the field may be applied at, for example, normal ambient temperature for a sufficient time to achieve the required alignment. The field may then be removed and the device will remain stored with or without cooling.

In the prior art, optical storage is well known in monomeric liquid crystals, namely the cholesteric and smectic mesophases. Storage devices utilise the different or varying optical transmission of two or more textures which may be thermally, electrically or magnetically induced. In a specific example an electric field applied to the Grandjean, or planar, texture of a cholesteric film, transforms it into the focal-conic or fingerprint textures which are sustained for a considerable period and exhibit moderately strong light scattering. Contrast ratios of 7:1 have been obtained in such devices. These induced textures are stable for periods up to several days, after which they will have reverted to the original state. Film thickness and surface alignment can be critical factors in these devices.

The present invention utilises a polymeric liquid crystalline medium in which an extremely stable stored texture, with an increased contrast ratio, can be induced by an aligning field applied across the material. These may be electric, magnetic, optical, acoustical or mechanical. By way of example, an electric field can be applied parallel or perpendicular to the viewing direction. In another example, a laser can be used to heat and simultaneously optically align a part or parts of the material.

In experiments so far carried out, a contrast ratio of up to $10^4:1$ can be established and sustained, apparently indefinitely, since no deterioration has become evident.

Figure 1:
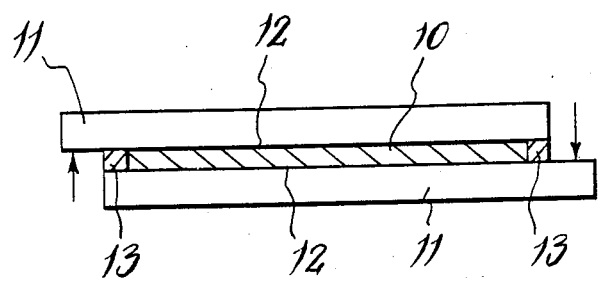

Referring now to FIG. 1, in a simple example, the polymer material 10 is contained as a thin film in a zone or cell defined by two superimposed glass plates 11 on the inner surfaces of which, transparent conductive films 12 have been deposited. Spacers 13 are used to define the cell thickness.

Figure 2:
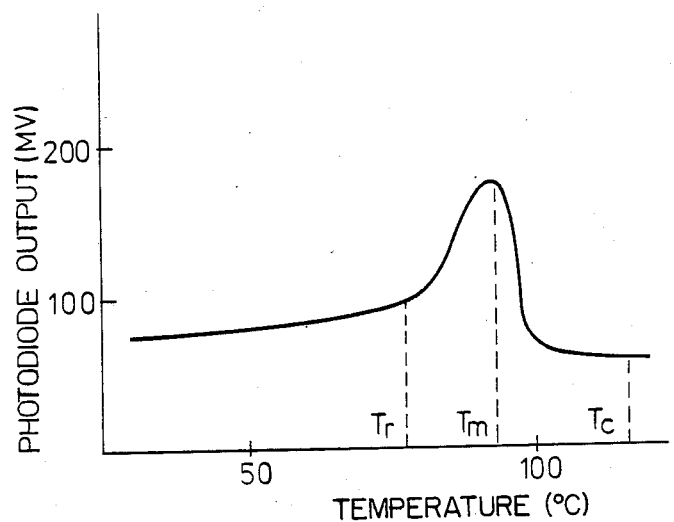
Figure 3:
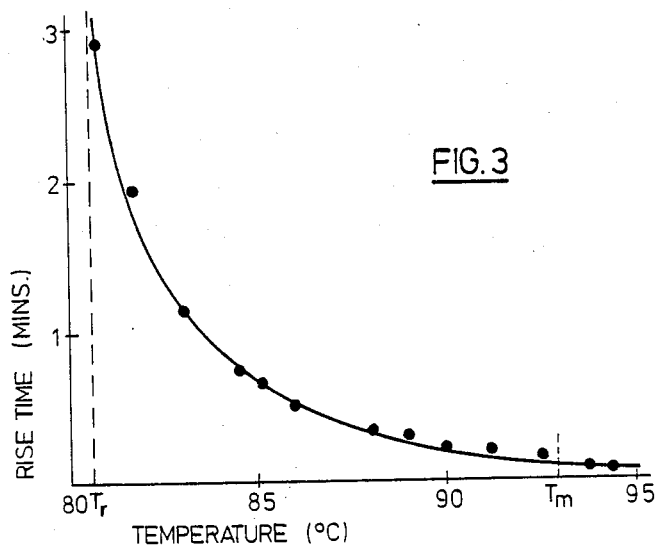
Figure 4:
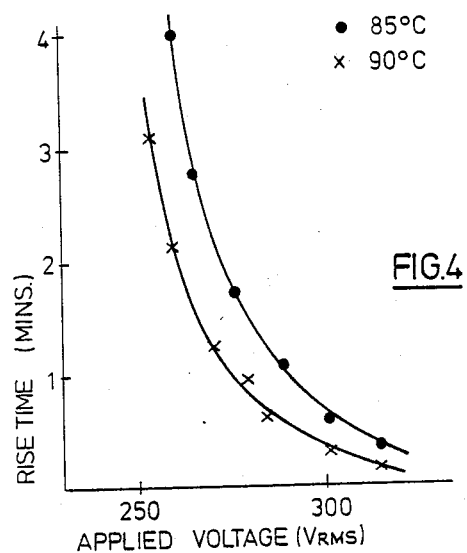
FIG. 4 shows that increasing the voltage applied to the sample reduces the response time. Two curves are shown, one at 85° C. and the other at 90° C. i.e. 8 centigrade degrees and 3 centigrade degrees below $T_m$.
Figure 5:
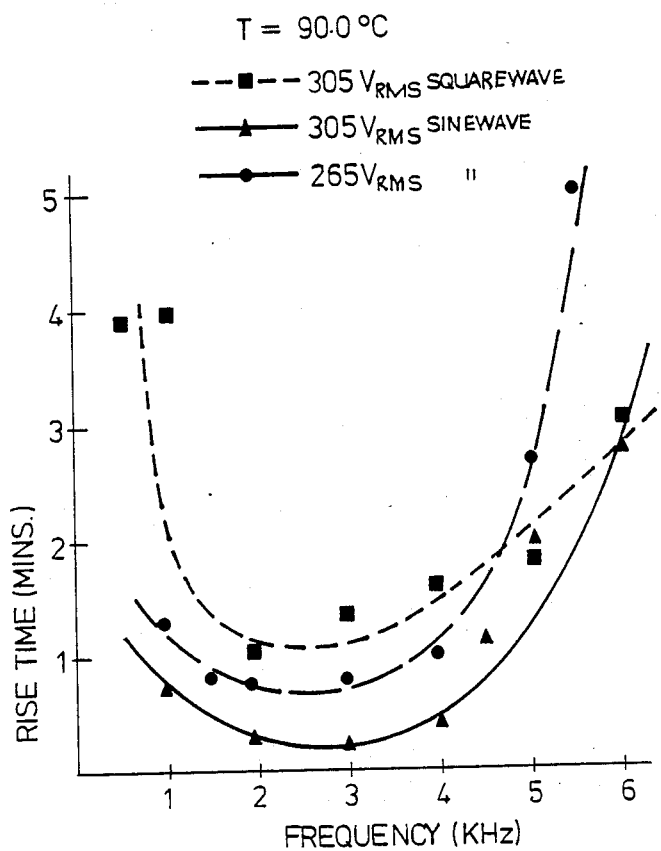
FIG. 5 shows the effect of varying frequency and waveform with a fixed voltage and temperature, and indicates that 305 $V_{rms}$ in the form of a sine wave at 3 KHz produces a considerably shorter response than the same voltage in the form of a square wave at the same frequency.

The conductive films 12 can be etched to provide a desired display pattern such as a dot matrix, seven-segment character, or meander pattern display. As illustrated in FIG. 2, field-induced alignment of the polymer layer 10 occurs when an electric field of sufficient strength is applied by the conducting films, if the polymer is elevated to a temperature in the range $T_r$ to $T_c$, and preferably close to its inherent clearing temperature $T_c$. The texture, so produced, may be stored, with the applied field removed, at temperatures below $T_r$. In the unaligned state the polymer film is opaque and provides minimal light transmission to the naked eye, whilst the field-aligned stored texture is optically isotropic and appears transparent. The stored texture or display can be erased either by elevating the polymer layer above $T_c$ and cooling without an applied electric field, or by changing the electric field parameters i.e. its frequency, direction or magnitude, or any combination thereof.

The stored texture may also be produced by subjecting the polymer to an aligning field at a temperature below $T_r$ and by locally heating specific areas above $T_r$. Upon cooling, this leads to a positive contrast stored display. Alternatively the said stored texture may be written upon by heating parts thereof above $T_c$ and cooling to provide a display showing negative contrast.

With both conducting films 12 transparent, a transmissive display is produced. Alternatively, reflective displays can be obtained by making one of the films 12 reflective, for example, as a thin evaporated metal film. In a similar way, coloured reflective displays can be made by placing coloured reflectors behind the cell to contrast with the normally white colour of the opaque polymer. Coloured polymers giving similar high contrast storage may be produced by using light absorbing polymer materials or by dissolving dye molecules into the polymer liquid crystal. Such dyes or polymers as well as being absorbing may also have fluorescent or like properties. This is analogous to the so called guest-host effect in monomeric liquid crystals but with the advantages described below.

In addition to the stated advantages of contrast ratio and shelf life of display devices produced as described above, when compared with low-molecular weight, or monomeric, liquid crystal storage displays, no surface treatment of the containing surfaces is required, and the cell thickness has no significant effect on the storage lifetime. Another significant advantage of the polymer storage device is the physical durability of the film. Whilst monomeric liquid crystral storage displays are highly sensitive to mishandling, i.e. the texture whether stored or unstored can be destroyed by sudden mechanical shock or any undue pressure on the cell, the stored polymer texture in the viscous state is extremely durable and can withstand even the physical destruction of the containing glass plates, i.e. the polymer layer retains the cracked or broken material. A further advantage of the polymer durabililty is that for large area displays spacers are not necessary. Indeed, the polymer may be adapted for use in the form of a thin sheet or laminate, or single layer as a coating on a flexible or rigid backing sheet. This is in direct contrast to monomeric systems.

The storage is preferably effected by smectic side chain polymers operating at temperatures well above their glass transition temperatures, i.e of the order of 50 centigrade degrees above $T_g$. In particular, polymers with a siloxane backbone of around 50 units in length, with side chains containing aromatic rings and substituted to have a strong positive dielectric anisotropy linked to the backbone by a suitably lengthened polymethylene unit are suitable.

As discussed above, it is essential for efficient operation of the devices of the invention to use polymeric materials in which $T_r$-$T_g$ is large. This is achieved by lowering $T_g$. The methods of lowering $T_g$ are well known to those practiced in the art. They include the following:

(i) Increasing the flexibility of the polymer backbone. The flexibility is increased progressively for methacrylates, acrylates and
siloxanes.

(ii) Changing the tacticity i.e. the alternation and arrangement of side chains along the backbone.

(iii) Adding plasticisers to the system, i.e by adding material which dissolve in the polymer system. Such materials include non-mesogenic materials such as solvents and dyes, and mesogenic materials such as monomeric liquid crystals which may themselves also act as dyes. These relatively small molecules not only depress $T_g$, but also lower $T_c$ and $T_r$. It is in fact possible to depress $T_g$ radically without significantly lowering $T_r$ and $T_c$. This is useful where a polymeric material is found to have a $T_r$ only just above $T_a$.

(iv) Lowering the molecular weight, though this can be accompanied by loss of viscosity in the viscous state which can interfere with storage life, or even prevent storage. We believe that molecular weights should not fall below 3000.

(v) Change the polydispersity.

(vi) Selecting a polymer with a particular side group structure or spacer length, as given in the table for homopolymers, or, mixing two or more different side chain polymeric liquid crystal materials, (vii) Mixing one or more non-mesogenic polymer dyes with one or more different side chain polymeric liquid crystal materials.

(viii) Making co-polymer materials i.e. the pendant side chains are made up of 2 or more different groups.

(ix) Adding dyes to the liquid crystal polymers as side groups and these can be chosen to alter $T_g$, $T_c$ and $T_r$ either up or down according to their chemical constitution. The concentration of dye can be up to 100% to create a dyed mesomorphic polymer.

(x) Cross-linking the polymeric liquid crystals to form an elastomeric material; this cross-linked compound then acts as a plasticiser or diluent and reduces $T_g$, $T_c$ and $T_r$.

Experimental work to study the effects of aligning fields on the textures of a number of polymer liquid crystal materials, has been carried out to determine the scope of the invention.

In the example illustrated and described, the cells were produced using 2.5 centimeter square glass plates with indium/tin oxide electrodes. Aligning fields were applied using pulsed sine or square waves of peak voltages up to around 500 volts and frequencies between 10 Hz and 1 MHz. Cell spacings of typically 20 microns were used, and a photo-diode detector was used to determine the optical transparency.

At temperatures close to the melting temperature $T_m$, both DC and AC fields were applied. Depending upon the voltage, frequency and wave form applied it is possible to induce either turbulent textures or static director reorientation. Polymer type CP 1 showed turbulence with DC and low frequency AC fields for sufficiently high voltages (around 300 volts), using cells having thicknesses of 10–30 microns.

Using AC fields and particularly square, sine and triangular wave AC fields it is possible to induce static homeotropic alignment. Optimum alignment is obtained using a sine wave AC field at a specific frequency which is material dependent, and the highest order is found using a smectic polymer at 2.5 KHz. The homeotropic alignment effectively has complete transparency even at viewing angles greater than 45°, which gives an extremely high contrast relative to the scattering texture. The spatial resolution may be of the order of a few microns, or less.

The higher the temperature of the sample above the glass transition $T_g$, the lower is the field needed to induce either turbulence or homeotropic orientation. Also, the optimum frequency for rapid realignment is material and cell thickness dependent. Response times which may be of the order of a few seconds depend upon frequency, voltage, cell thickness, material, temperature and the thermal history of the polymer.

It is clear that the smectic materials give higher order and better contrast displays than the nematic and cholesteric materials, and the latter two phases do not respond significantly faster than the smectic materials. Indeed, with the smectic materials alignment has been effected using RMS voltages of the order of a few tens of volts, with writing completed in less than 100 milliseconds.

For co-polymer CP 1, the thermo-optic curve used to provide values for $T_g$, $T_r$, $T_m$ and $T_c$ is as illustrated in FIG. 2. These values were discovered experimentally by observing the sample between crossed polarisers and measuring the light transmission through the system as a function of temperature. At low temperatures (30° to 80° C.) the scattering texture is immobile and the transmission is low due to the turbidity of the sample and only various slowly with temperature. At around 80° C. the texture becomes optically mobile and the transmission increases suddenly. At $T_m$ the sample starts to melt as evidenced by small dark regions appearing in the texture. Further increases in temperature lead to an increase of dark area until the final traces of birefringent structure disappear at $T_c$, the so-called clearing temperature. It is believed that this is primarily due to the inherent polydispersity of the main chain siloxane units used in the synthesis.

METHODS OF ALIGNMENT (i) Laser or Optical

In place of electric field alignment, other addressing techniques can be adopted.

For example, a laser can be used to effect optical alignment and simultaneous heating of the polymer, or to write a scattering texture on a previously aligned homeotropic texture (electrically or otherwise aligned). Alternatively birefringent textures can be written on nonaligned or aligned samples by traversing a laser beam across the sample.

When $T_r - T_a$ is large it is advantageous to include dichroic or fluorescent dyes in the polymer liquid crystal. These dyes augment the absorption of energy and writing may be readily effected by a laser field at $T_a$ with $T_r$ tens or more degrees above $T_a$, e.g. when $T_r$ is about 90° C. Furthermore if $T_r-T_a$ is small, by including a dye writing may be achieved at lower intensities.

The resolution achieved with laser writing is on the scale micrometers or less and appears to be limited only by the laser spot size which is a function of the quality of the optics. Writing is effected with microsecond pulses (or less) with an energy density of about 4nJ/um², making video or high resolution devices possible. The writing may be projected or displayed by known methods.

In a simple case, optical writing can be effected by a non-laser device such as a tungsten lamp or even sunlight.

Since, in addition to scattering, birefringent texture may be induced, it is possible to produce extra levels of storage using polarisers and thus birefringence colours. An application is in the field of hidden indicia, for example, for security devices. With laser induced fields, as with electric fields, by varying the power levels or voltage, contrast control can be achieved.

(ii) Magnetic

A magnetic field can be used to produce alignment in the fluid region, which, however, can take hours or even days to complete. A faster response can be produced by doping the polymer liquid crystal with ferric oxide.

(iii) Surface or Stress

If surface alignment is required it is known technology that aligning agents or surfactants may be used for monomeric liquid crystals. This is not so evident for polymeric liquid crystals. However we have found that rubbed polyimide surfaces do give homegeneous (parallel to surface) alignment for polymer liquid crystals.

Homeotropic alignment is readily manifest using stress fields.

Combinations of magnetic, electric, laser and stress fields could be used selectively to achieve the desired alignment. Thus, with a field already applied, a laser can be used to heat the sample locally above $T_r$. In this way a clear display (or scattering of different textures) could be made on a scattering background. Similarly, a "heat pen" could be used to scribe reversibly across an opaque screen, or with no existing field, across a clear homeotropic screen.

TYPES OF STORAGE (i) Scattering

For non-doped polymers the scattering texture is opaque and when aligned homeotropically becomes optically clear. Fast cooling rates, i.e., from addressing temperature to storage temperature of the order of a few seconds, give greater scattering than slow rates where partial annealing takes place during cooling, i.e. the smectic "grains" grow and scatter less as there are fewer scattering boundaries. This is important for thin films and produces high density scattering as the films will cool rapidly to $T_a$ because of their relatively small bulk. This effect is for longitudinal electrodes but, as mentioned previously, transverse electrodes can be used to store homogeneous texture with predominant alignment in the horizontal plane. As the refractive index is anistropic, so such a region is birefrigent. A similar effect would be obtained if the materials used were negative rather than positive dielectric anisotropy.

Besides optical switching properties a non-linear optical response can be obtained. In one experiment radiation from an iodine laser at $\lambda=1.35$ micrometers was passed through an aligned sample. Some proportion of this is frequency doubled and emerges as red light at 675 nm. Other higher orders are observed at 337 nm and combinations, i.e. 1.01 micrometers and 437 nm (trebled) are observed. The input pulses are weakly focussed through the sample with 1-2 microsecond pulses. It is important in this application that the sample is non-consumptively absorbing at this wavelength (1.35 micrometres) or writing (i.e. heating) would occur. The compounds studied have a peak transmission in the near infra-red. If dyes which are strongly optically non-linear, for example nitro-stilbenes, are included in the polymeric material, these optical non-linearities are strengthened.

(ii) Dye Systems

By the use of blue laser light weak writing has been observed in undyed systems but the inclusion of dye significantly improves performance.

Two classes of dyes have been used, namely dichroic or pleochroic (straight consumptive absorption) and fluorescent (absorption and re-emission at a different wavelength). Dichroic or pleochroic dyes which are soluble in liquid crystal polymeric materials can be used in the so-called guest host effect. As fields are applied to align the polymers so the dyes are also co-operatively aligned. In this way we have produced displays of different colours such as yellow, green, orange, blue, red, mauve and black. Almost any colour or shade is therefore possible. For homeotropic alignment the system is essentially clear whereas in the scattering state the polymer is brightly coloured. Using homogeneous alignment the dyes become a coloured polarising medium as they absorb preferentially in one direction.

Besides giving very bright coloured displays which are particularly attractive on reflection with a metallic mirror, the inclusion of dyes significantly improves the speed and efficiency of the laser writing process. By including dyes and modifying the laser output power or pulse duration, there can be produced levels of colour (grey scales) and this will lead to multiple information being stored on one point. (Grey scales is a term used to described controllable light levels).

Fluorescent dyes are also aligned by the reorientation process and give rise to bright displays. As a consequence of the polarisation of the emitted light the new colour switching effect for polymer liquid crystals is obtained. Generally, depending upon the dye structure, different degrees of light will be transmitted by the dye in the vertical and horizontal planes. Use of polarising filters allows this to be seen clearly. Laser addressing is particularly useful in these systems.

With all types of dye, dichroic, pleochroic or fluorescent, it is also possible to choose the position of the absorption either in the visible spectrum or in the ultra-violet or infra-red areas. Thus it is possible to dissolve an ultra-violet or infra-red dye which is clear in the physical, and then choose a convenient ultra-violet or infra-red light source to effect the absorption. Thus a visibly clear track on opaque or opaque on clear, or birefringent on opaque or clear may be readily induced. Pulses down to nanoseconds are easily achievable.

With all of the types of dyes mentioned above, both homogenious and homeotropic alignment of the polymer serves also to align the dyes concomitant with the polymer.

By experimentation, it has become evident that there are many applications, both scientifiic and commercial, for a polymer liquid crystal storage device made in accordance with the invention. Some examples are advertising displays, audio-visual presentation including laser addressing, variable optical density systems, such as photographic or photo-imaging or photo-copying devices; data storage for computer or video purposes, and any other application in which permanent or changeable displays with increased durability are required, but where the almost instantaneous change in appearance, commonly found in monomeric liquid crystals, is not essential.

A specific example of a variable optical density device is an optical switch or variable transmission system, where the device can undergo a transition from a clear to a darkened state. The use in this form is not limited to a simple on/off optical device, but also includes use as a variable transmission window. This is a feasible application because of the ability of the device to store an alignment at ambient temperature, without cooling to below $T_g$. It is also preferable for such applications to be able to use relatively low voltages for heating and addressing the device to cause a change in transmission, and this is possible.

Our invention, therefore, also includes a variable transmission device in which there is provided an area of material containing a side chain polymeric liquid crystal disposed between two transparent surfaces, provided with means to raise the temperature of the polymer above $T_r$, means to address at least a part of the area containing the polymer to convert it to a transmitting from a less-transmitting state when above $T_r$, so that when the polymer is allowed to cool to ambient temperature it retains the transmitting state without an applied field.

A window of this type has the advantage over previously proposed variable transmission windows in that the window is maintained in the transmitting or less-transmitting state without any continuous external heating or applied voltage.

What is claimed is:

1. A liquid crystal information storage device comprising a layer of material containing a side chain polymeric liquid crystal of a type having a glass transition temperature Tg less than ambient temperature Ta normally experienced atmospherically, and a further temperature Tr at which the viscosity suddenly decreases and above which the material becomes fluid while remaining in the same mesophase up to Tm, corresponding to the point at which the isotropic or clear phase first begins to appear, and is biphasic until Tc at which temperature the material becomes fully isotropic where $Tc > Tm > Tr > Ta > Tq$, means for effecting a thermal transition of at least a part of the material from a viscous state in which its temperature is in the range Tg to Tr, to the fluid region above Tr, and means for addressing at least a part of the material in the fluid region so as to achieve a selective variation in texture and orientation of molecules within the material and so record information, which information is retained on allowing the material to cool out of the fluid region and return to the viscous state.

2. A device according to claim 1, in which said layer of material contains a smectogenic side chain polymeric liquid crystal.

3. A device according to claim 1, wherein said polymeric liquid crystal is of the polysiloxane type having cyano-biphenyl side chains.

4. A device according to claim 3, wherein said polymeric liquid crystal contains benzoic ester side chains.

5. A device according to claim 4, in which said polymeric liquid crystal has a structure given by the formula

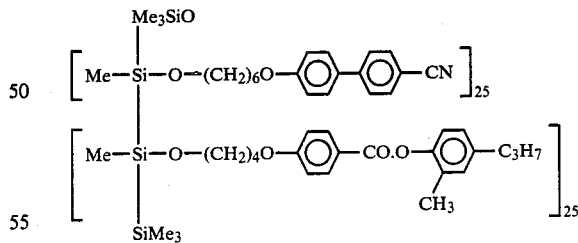

6. A device according to any preceding claim, in which said addressing means includes means for applying an electric field to the material thus to effect field-induced alignment in the form of a sine wave at a frequency of 2 to 4 kHz.

7. A device according to claim 1, in which said addressing means includes means for applying a magnetic field to the material.

8. A device according to claim 1, wherein said addressing means includes means for applying an optical field to the material.

9. A device according to claim 1, in which said layer of material is contained as a thin film between two superimposed transparent supporting plates.

10. A device according to claim 9, wherein transparent conductive films are deposited on the inner surface of said supporting plates.

11. A device according to claim 10, wherein said conductive films are etched to provide a desired display pattern.

12. A device according to claim 1, wherein said layer of material is provided as a surface coating on a backing sheet.

13. A device according to claim 1, wherein said polymeric liquid crystal has a temperature $T_r$ in excess of 70° C. and a clearing temperature in excess of 100° C.

14. A device according to claim 1, wherein said polymeric liquid crystal has a molecular weight in excess of 3000.

15. A device according to claim 1, wherein said material contains a dye.

16. A device according to claim 15, wherein said material contains a dichroic or pleochroic dye.

17. A device according to claim 15, in which said material contains a fluorescent or non-linear dye.

18. A device according to claim 1, including a laser to serve as said means for effecting said thermal transition and said addressing means, and acting simultaneously to heat and optically address at least part of said material to record said information.

19. A method of producing a liquid crystal information storage device, comprising the steps of providing a layer of material containing a side chain polymeric liquid crystal of a type having a glass transition temperature Tg less than ambient temperature Ta normally experienced atmospherically, and a further temperature Tr at which the viscosity suddenly decreases and above which the material becomes fluid while remaining in the same mesophase up to Tm, corresponding to the point at which the isotropic or clear phase first begins to appear, and is biphasic until Tc at which temperature the material becomes fully isotropic where Tc>Tm>Tr>Ta>Tg, effecting a thermal transition of at least a part of the material from a viscous state in which its temperature is in the range Tg to Tr, to the fluid region above Tr, addressing at least a part of the material in the fluid region so as to achieve a selective variation in texture and orientation of molecules within the material and so record information, and allowing the material to cool out of the fluid region and return to the viscous state whereupon said information is retained.

20. A method according to claim 19, wherein said addressing is effected by field-induced alignment of the material at an elevated temperature below the inherent clearing temperature of said polymeric liquid crystal, said material being cooled to said viscous state prior to removing said field.

21. A variable transmission device in which there is provided an area of material containing a side chain polymeric liquid crystal of a type having a glass transition temperature Tg less than ambient temperature Ta normally experienced atmospherically, and a further temperature Tr at which the viscosity suddenly decreases and above which the material becomes fluid while remaining in the same mesophase up to Tm, corresponding to the point at which the isotropic or clear phase first begins to appear, and is biphasic until Tc at which temperature the material becomes fully isotropic where Tc>Tm>Tr>Ta>Tq, said crystal being disposed between two transparent surfaces, means to raise the temperature of at least a part of said material above Tr, means to address at least a part of the area containing the polymer to convert it to a transmitting from a less-transmitting state when above Tr which state is retained on allowing the material to cool to a temperature below Tr without an applied field.

* * * * *

UNITED STATES PATENT AND TRADEMARK OFFICE
CERTIFICATE OF CORRECTION

PATENT NO. : 4,702,558

DATED : October 27, 1987

INVENTOR(S) : Harry J. Coles, Richard Simon

It is certified that error appears in the above-identified patent and that said Letters Patent is hereby corrected as shown below:

Column 14, line 24, cancel "Tq" and insert --Tg--.

Column 16, line 31, cancel "Tq" and insert --Tg--.

Signed and Sealed this

Thirtieth Day of August, 1988

Attest:

DONALD J. QUIGG

*Attesting Officer*         *Commissioner of Patents and Trademarks*